(12) United States Patent
Nakamura et al.

(10) Patent No.: US 12,298,190 B2
(45) Date of Patent: May 13, 2025

(54) TEMPERATURE THRESHOLD DETERMINING DEVICE, TEMPERATURE ABNORMALITY DETERMINING SYSTEM, TEMPERATURE THRESHOLD DETERMINING METHOD

(71) Applicant: OMRON Corporation, Kyoto (JP)

(72) Inventors: Takahiro Nakamura, Ritto (JP); Ryo Ikeuchi, Kumamoto (JP); Tatsuaki Kozono, Kusatsu (JP); Takaaki Yamada, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 825 days.

(21) Appl. No.: 17/218,821

(22) Filed: Mar. 31, 2021

(65) Prior Publication Data

US 2021/0215545 A1 Jul. 15, 2021

Related U.S. Application Data

(63) Continuation of application No. PCT/JP2019/036452, filed on Sep. 18, 2019.

(30) Foreign Application Priority Data

Oct. 31, 2018 (JP) ................... 2018-205486

(51) Int. Cl.
*G01K 3/10* (2006.01)
(52) U.S. Cl.
CPC ...................... *G01K 3/10* (2013.01)
(58) Field of Classification Search
CPC .......... G01K 3/10; G01K 3/005; G01K 1/022; G05B 23/0235
See application file for complete search history.

(56) References Cited

U.S. PATENT DOCUMENTS

2005/0125199 A1* 6/2005 Slaight ................... G05D 27/02
702/186
2007/0156373 A1* 7/2007 Yamashita .............. G06F 17/30
702/182

(Continued)

FOREIGN PATENT DOCUMENTS

GB 2533615 A * 6/2016 ......... A61B 10/0012
JP 2003172567 A 6/2003

(Continued)

OTHER PUBLICATIONS

EPO Extended European Search Report for corresponding EP Application No. 19879870.4; Issued on Mar. 28, 2022.

(Continued)

*Primary Examiner* — Catherine T. Rastovski
*Assistant Examiner* — Lal C Mang
(74) *Attorney, Agent, or Firm* — CANTOR COLBURN LLP

(57) ABSTRACT

The temperature threshold determining device includes a temperature data storage unit, a representative temperature value determining unit, and a temperature threshold determining unit. The temperature data storage unit stores temperature data that indicates the temperature of a target apparatus during past operation. The representative temperature value determining unit determines a representative temperature value of the target apparatus during the past operation, which is derived using the temperature data stored in the temperature data storage unit. The temperature threshold determining unit determines at least one temperature threshold by using the representative temperature value during the past operation and a reference temperature value that is preset and configured to prevent the temperature abnormality.

10 Claims, 11 Drawing Sheets

(56) References Cited

U.S. PATENT DOCUMENTS

| | | | | |
|---|---|---|---|---|
| 2015/0233771 A1* | 8/2015 | Uno | ................. | G01K 11/32 |
| | | | | 374/4 |
| 2016/0163179 A1* | 6/2016 | Matsumoto | .......... | G08B 21/182 |
| | | | | 340/540 |
| 2020/0168966 A1* | 5/2020 | Hong | ................. | H01M 10/615 |

FOREIGN PATENT DOCUMENTS

| | | | | | |
|---|---|---|---|---|---|
| JP | | 2006295413 A | | 10/2006 | |
| JP | | 2016110594 A | | 6/2016 | |
| JP | | 2018161668 A | * | 10/2018 | ............. B21B 38/00 |

OTHER PUBLICATIONS

SIPO First Office Action issued in corresponding CN Application No. 201980064871.0; Dated Nov. 30, 2023; 13 pages.
International Search Report for International Application No. PCT/JP2019/036452; Date of Mailing, Nov. 26, 2019.
PCT Written Opinion of the International Searching Aurhority for International Application No. PCT/P2019/036452; Date of Mailing, Nov. 26, 2019.

* cited by examiner

Fig. 12

ABNORMAL REFERENCE TEMPERATURE: 100°C
CURRENT TEMPERATURE: 30°C
WARNING THRESHOLD COEFFICIENT: 0.35
ABNORMAL THRESHOLD COEFFICIENT: 0.6

| TEMPERATURE | START ENERGIZATION (25°C) | 54.5°C (WARNING THRESHOLD) | 72°C (ABNORMAL THRESHOLD) | 100°C | 120°C |
|---|---|---|---|---|---|
| SITUATION | ENERGIZATION TEST WAS STARTED IN TEST MACHINE REPRODUCING ABNORMALITY | WARNING LEVEL WAS REACHED IN ABOUT 30 MINUTES FROM ENERGIZATION. AT THIS POINT, USER CAN KNOW SIGNS OF ABNORMALITY. NO PARTICULAR CHANGE WAS OBSERVED IN TEST MACHINE AT THIS POINT. | ABOUT 30 MINUTES LATER, ABNORMAL THRESHOLD WAS REACHED. AT THIS POINT, USER CAN TAKE SOME ACTION FOR TARGET HAVING ABNORMALITY. NO PARTICULAR CHANGE WAS OBSERVED IN TEST MACHINE AT THIS POINT. | AS A RESULT OF LEAVING THE SITUATION UNATTENDED FURTHER, ABNORMAL REFERENCE TEMPERATURE WAS REACHED AT THIS POINT. NO PARTICULAR CHANGE WAS OBSERVED IN TEST MACHINE. ALTHOUGH ABNORMAL REFERENCE TEMPERATURE IS THE WORST CONDITION WITH A RISK OF FIRING, IT IS ASSUMED THAT THERE WERE STILL MARGIN IN THIS CASE. | AS A RESULT OF LEAVING THE SITUATION UNATTENDED STILL FURTHER AND TEMPERATURE REACHED THE CERTAIN LEVEL, SMOKING STARTED. TEMPERATURE RISE STOPPED AND SMOKING CONTINUED AT THE CERTAIN TEMPERATURE. RESIN CASING ALSO STARTED TO MELT. |

TEMPERATURE THRESHOLD DETERMINING DEVICE, TEMPERATURE ABNORMALITY DETERMINING SYSTEM, TEMPERATURE THRESHOLD DETERMINING METHOD

CROSS-REFERENCE TO RELATED APPLICATIONS

The present application is a continuation application of International Application No. PCT/JP2019/036452, filed Sep. 18, 2019, which claims priority to Japanese Patent Application No. 2018-205486, filed Oct. 31, 2018. The contents of these applications are incorporated herein by reference in their entirety.

BACKGROUND

Technical Field

The present disclosure relates to a temperature threshold determining device, a temperature abnormality determining system, a temperature threshold determining method, and a program.

Description of the Related Art

Conventionally, there has been a technique for detecting a temperature abnormality of apparatuses arranged in a casing and a facility. For example, there is a technique for measuring the temperature of the apparatus and determining a temperature threshold by using the standard deviation of the measurement results. Japanese Unexamined Patent Application Publication No. 2016-110594 discloses a technique to collect measurement values being measurement results of monitoring points and to determine the temperature threshold using the average value and the standard deviation of the measurement values.

SUMMARY

According to one aspect of the present invention, a temperature threshold determining device determines a temperature threshold used to determine whether or not a temperature abnormality has occurred in a target apparatus, the temperature threshold determining device including:
- a temperature data storage unit storing temperature data that indicates temperature of the target apparatus during past operation;
- a representative temperature value determining unit that determines a representative temperature value of the target apparatus during the past operation, which is derived using the temperature data stored in the temperature data storage unit; and
- a temperature threshold determining unit that determines at least one temperature threshold by using the representative temperature value during the past operation and a reference temperature value that is preset and configured to prevent the temperature abnormality.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 12 is a diagram showing results of a verification experiment performed by the above temperature abnormality determining device as a table.

DESCRIPTION OF THE EMBODIMENTS

Figure 1:
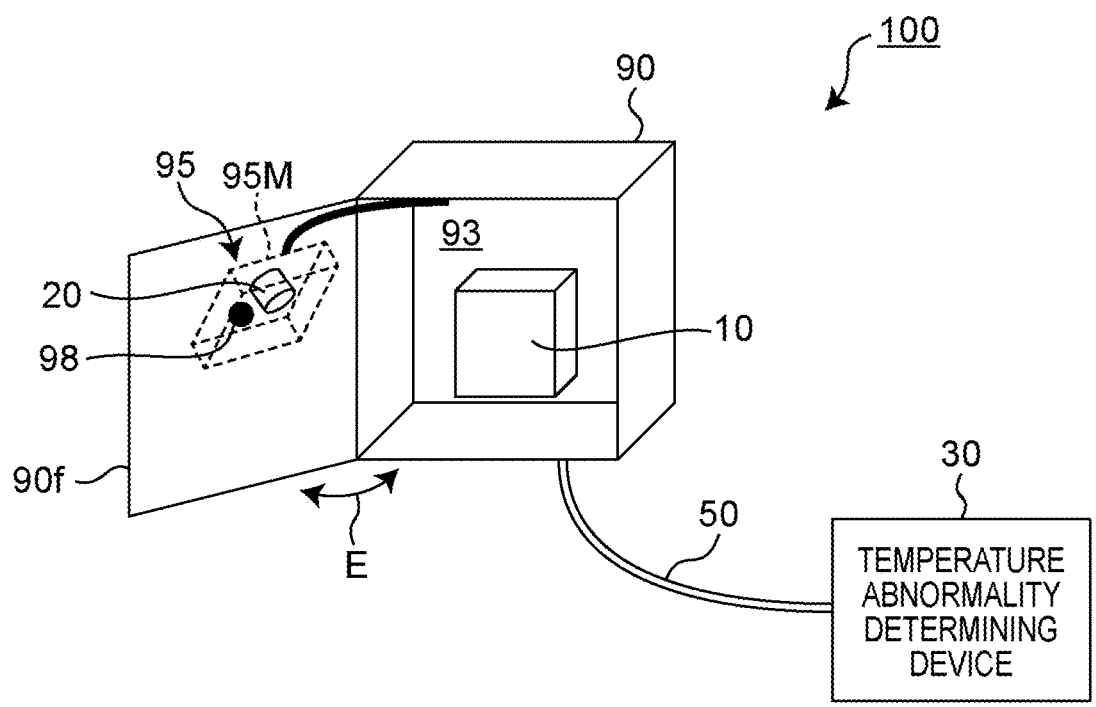
FIG. 1 is a diagram showing a schematic configuration of a temperature abnormality determining system according to an embodiment.

The embodiments will now be described with reference to the accompanying drawings, wherein like reference numerals designate corresponding or identical elements throughout the various drawings.

Hereinafter, an embodiment of the present invention is described in detail with reference to the drawings.
(System Configuration)

FIG. 1 schematically shows a schematic configuration of a temperature abnormality determining system 100 according to one embodiment of the present invention. In this example, the temperature abnormality determining system 100 determines the temperature abnormality of a target apparatus 10 arranged in a control board 90. Further, the temperature abnormality determining system 100 determines a temperature threshold (hereinafter, referred to as a temperature threshold Tth) used at the time of the determination. As shown in FIG. 1, the temperature abnormality determining system 100 includes the target apparatus 10, a sensor device 95 (a temperature sensor 20 and another temperature sensor 98), and a temperature abnormality determining device 30 incorporating a temperature threshold determining device.

As shown in FIG. 1, the target apparatus 10 is arranged in the control board 90, and the sensor device 95 is arranged on the inner side of a front door 90f of the control board 90. The front door 90f can be opened and closed in the direction indicated by an arrow E in FIG. 1. As can be seen from FIG. 1, the temperature abnormality determining device 30 is arranged separately from the control board 90 (sensor device 95). In this example, the sensor device 95 inside the control board 90 (that is, the temperature sensor 20 and the another temperature sensor 98) and the temperature abnormality determining device 30 outside the control board 90 is communicably connected with each other via a signal cable 50. The sensor device 95 and the temperature abnormality determining device 30 may be communicably connected via wireless communication.

(Configuration Inside Control Board)

Figure 2:
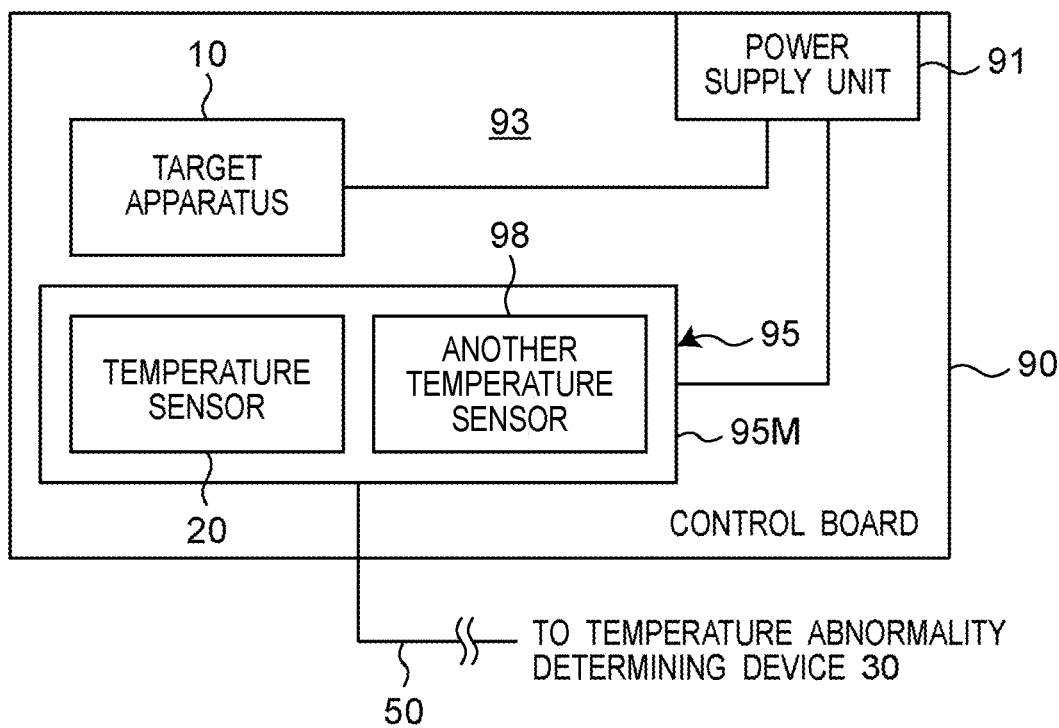
FIG. 2 is a diagram showing a block configuration of a control board included in the temperature abnormality determining system of FIG. 1.

The control board 90 has a general configuration, and in this example, is a casing having a rectangular parallelepiped outer shape. FIG. 2 shows a schematic configuration inside the control board 90 as a block diagram. A power supply unit 91, the target apparatus 10, and the sensor device 95 are arranged on the control board 90. In the example of FIG. 2, the target apparatus 10 and the power supply unit 91 are arranged in the control board 90. The sensor device 95 is arranged in the control board 90 when the front door 90f is closed. The power supply unit 91 supplies electric power to the target apparatus 10 and the sensor device 95. Then, the target apparatus 10 and the temperature sensor 20 operate by receiving the electric power. Note that the sensor device 95 may independently have a power supply such as a battery and receive electric power from the power supply to operate.

The target apparatus 10 according to the present embodiment is a member whose temperature may rise during operation. For example, the target apparatus 10 is a device of various types such as a DC power supply, a contactor, a regulator, a motor driver, and a breaker. Further, the target apparatus 10 may be a power semiconductor, a relay, a heat sink, power system wiring, a terminal, or others that forms a part of the device.

The sensor device 95 includes a sensor casing 95M having a flat rectangular parallelepiped outer shape, the temperature sensor 20 mounted on the sensor casing 95M, and the another temperature sensor 98 accommodated in the sensor casing 95M. The temperature sensor 20 is, for example, a radiation temperature sensor. The another temperature sensor 98 is, for example, a contact type temperature sensor (resistance temperature detector). The another temperature sensor 98 may be a contact type temperature sensor of another type such as a thermistor, a thermocouple, or an IC temperature sensor, instead of the resistance temperature detector.

The temperature sensor 20 arranged on the inner side the front door 90f of the control board 90 is arranged in the control board 90 with the front door 90f of the control board 90 closed, and faces the target apparatus 10. The temperature sensor 20 detects the temperature of the target apparatus 10 and generates temperature data as the detection result. When the temperature sensor 20 detects the temperature of the target apparatus 10, the front door 90f of the control board 90 is in the closed state. The temperature sensor 20 transmits the generated temperature data to the temperature abnormality determining device 30 via the signal cable 50.

The another temperature sensor 98 arranged on the inner side the front door 90f of the control board 90 is arranged in the control board 90 with the front door 90f of the control board 90 closed. The another temperature sensor 98 detects the temperature of ambient air 93 around the target apparatus 10 and generates ambient temperature data as the detection result. When the another temperature sensor 98 detects the temperature of the ambient air 93, the front door 90f of the control board 90 is in the closed state. The another temperature sensor 98 transmits the generated ambient temperature data to the temperature abnormality determining device 30 via the signal cable 50.

(Configuration of Temperature Abnormality Determining Device)

Figure 3:
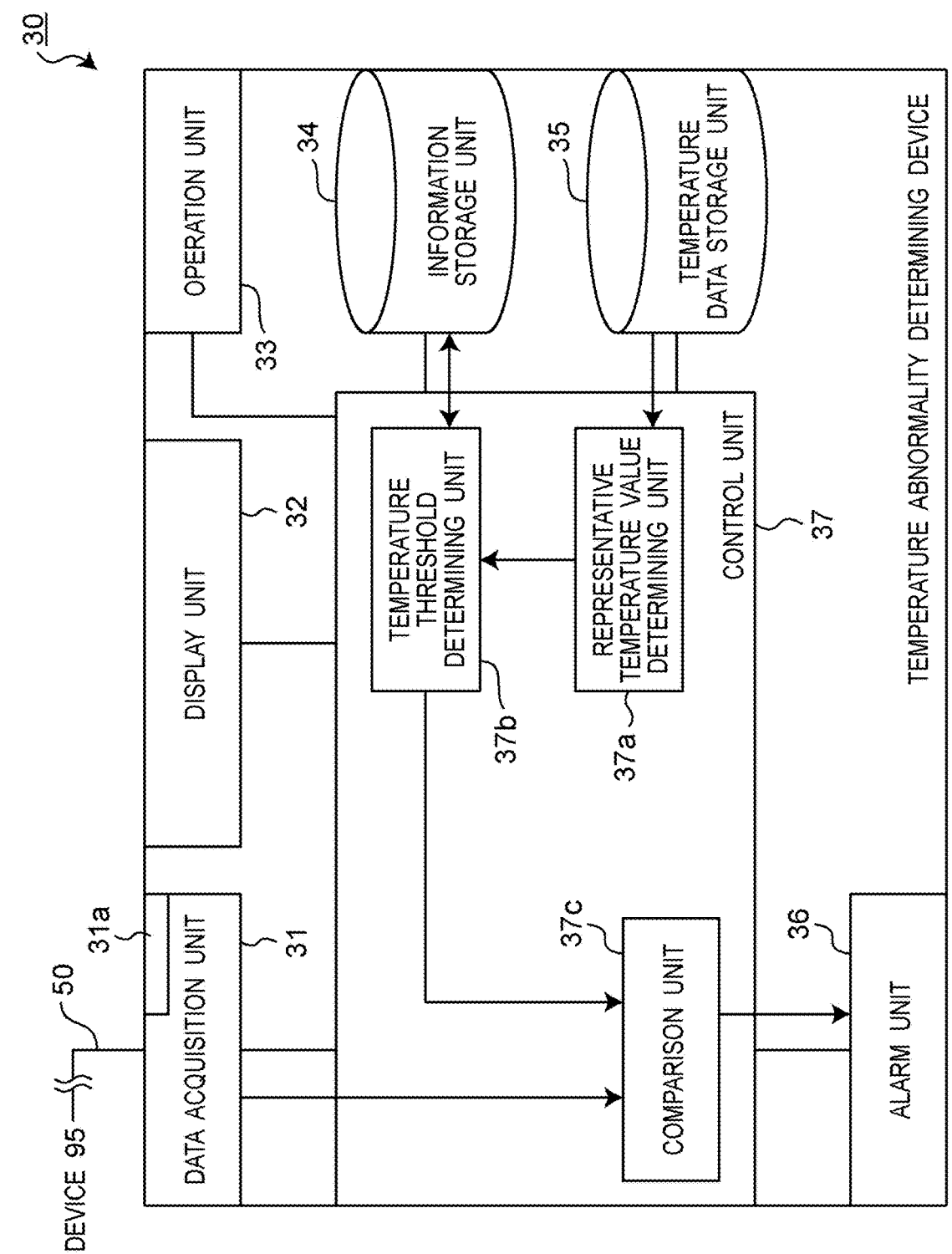
FIG. 3 is a diagram showing a block configuration of a temperature abnormality determining device included in the temperature abnormality determining system of FIG. 1.

Next, a schematic configuration of the temperature abnormality determining device 30 is specifically described. FIG. 3 shows a block configuration of the temperature abnormality determining device 30 according to the present embodiment.

The temperature abnormality determining device 30 includes the temperature threshold determining device. The temperature threshold determining device in the temperature abnormality determining device 30 determines the temperature threshold Tth used to determine whether or not the temperature abnormality has occurred in the target apparatus 10. In other words, a portion of the temperature abnormality determining device 30 that has a circuit unit involved in determining the temperature threshold Tth is the temperature threshold determining device. Therefore, in this case, the temperature threshold determining device includes at least a temperature data storage unit 35, a representative temperature value determining unit 37a, and a temperature threshold determining unit 37b, which are described later.

The temperature abnormality determining device 30 uses the temperature threshold Tth to determine whether or not the temperature abnormality has occurred in the target apparatus. As shown in FIG. 3, the temperature abnormality determining device 30 according to the present embodiment includes a data acquisition unit 31, a display unit 32, an operation unit 33, an information storage unit 34, a temperature data storage unit 35, an alarm unit 36, and a control unit (processor or electric circuit) 37. In the temperature abnormality determining device 30, the data acquisition unit 31, the display unit 32, the operation unit 33, the information storage unit 34, the temperature data storage unit 35, and the alarm unit 36 are communicably connected to the control unit 37. With this configuration, the control unit 37 controls the data acquisition unit 31, the display unit 32, the operation unit 33, the information storage unit 34, the temperature data storage unit 35, and the alarm unit 36, and by the control, each of the units 31, 32, 33, 34, 35, and 36 performs a predetermined operation.

The data acquisition unit 31 transmits and receives various types of data to and from an external terminal. For example, the data acquisition unit 31 according to the present embodiment is connected to the temperature sensor 20 via the signal cable 50. Therefore, the data acquisition unit 31 receives the temperature data generated by the temperature sensor 20 via the signal cable 50. The data acquisition unit 31 may have an external device mounting port 31a (see FIG. 3). For example, it is assumed that a universal serial bus (USB) memory device records a plurality of pieces of temperature data indicating the temperature of the target apparatus 10 detected during a test operation. In this case, by mounting the USB memory device or the like to the external device mounting port 31a, the data acquisition unit 31 can receive the plurality of pieces of temperature data or the like from the USB memory device.

The display unit 32 is a monitor that displays various images. The display unit 32 can visually display the results and the like of various analyses in the control unit 37. In addition, predetermined information can be visually displayed at the request of a user through the operation unit 33. For example, the display unit 32 may visually display the information (data) stored in each of the storage units 34 and 35. Further, the display unit 32 may visually display a predetermined alarm notification. For example, a liquid crystal monitor can be adopted as the display unit 32.

The operation unit (which can be understood as an instruction receiving unit) 33 is a part that receives a predetermined operation (instruction) from the user. For example, the operation unit 33 is constituted of such as a mouse and a keyboard. Note that when a touch panel type monitor is adopted as the display unit 32, the display unit 32 has not only a display function but also a function as the operation unit 33.

The information storage unit 34 stores various types of data. The information storage unit 34 is a memory including a random access memory (RAM), a read only memory (ROM), and others. For example, various programs are stored in a modifiable manner in the information storage unit 34. Further, at least one temperature threshold Tth is stored in the information storage unit 34.

Here, the temperature threshold Tth is determined by the control unit 37 as described later. The temperature threshold Tth stored in the information storage unit 34 can be changed. For example, when the user performs an operation of changing the temperature threshold Tth through the display unit 32, the operation unit 33, and the like, the temperature threshold Tth stored in the information storage unit 34 can be changed according to the instruction from the user received by the operation unit 33. The information storage unit 34 may have a predetermined temperature threshold Tth as a default.

The temperature data storage unit 35 is a memory and stores temperature data and the like generated by the temperature sensor 20. Then, the plurality of pieces of temperature data are transmitted to the temperature data storage unit 35 via the data acquisition unit 31. The temperature data storage unit 35 may delete the stored temperature data after the elapse of a preset predetermined time period.

The temperature data stored in the temperature data storage unit 35 includes temperature data indicating the temperature of the target apparatus 10 during the past operation and temperature data indicating the temperature of the target apparatus 10 during the current operation detected by the temperature sensor 20 in real time. In addition, "during the past operation of the target apparatus 10" means during operation before the time of current operation. For example, in addition to the test operation of the target apparatus 10, the past actual operation (operation other than the test operation) of the target apparatus 10 may be included.

The alarm unit 36 outputs a predetermined alarm (notification). For example, when the alarm unit 36 includes such as a speaker, the alarm unit 36 outputs a predetermined sound as an alarm. Further, for example, when the alarm unit 36 includes a member that outputs predetermined light, the alarm unit 36 outputs the light. The display unit 32 can be provided with the function of the alarm unit 36, and in this case, a predetermined alarm is visually displayed on the display unit 32.

In this example, the control unit 37 includes a central processing unit (CPU) as a processor. For example, the control unit 37 reads each program and each piece of data stored in the information storage unit 34. In addition, the control unit 37 controls each of the units 31 to 36 according to the read program to execute a predetermined operation (function). In addition, the control unit 37 performs predetermined calculations, analyses, processes, and others in the control unit 37 (each of blocks 37a, 37b, and 37c constituted of the program) according to the read program. It should be noted that a part or all of each function executed by the control unit 37 may be configured in hardware by such as one or a plurality of integrated circuits.

As shown in FIG. 3, the control unit 37 according to the present embodiment includes the representative temperature value determining unit 37a, the temperature threshold determining unit 37b, and the comparison unit 37c as functional blocks. The operations of the blocks 37a, 37b, and 37c are described in detail in the description of the operations described later.

(Temperature Threshold Determining Operation)

Figure 4:
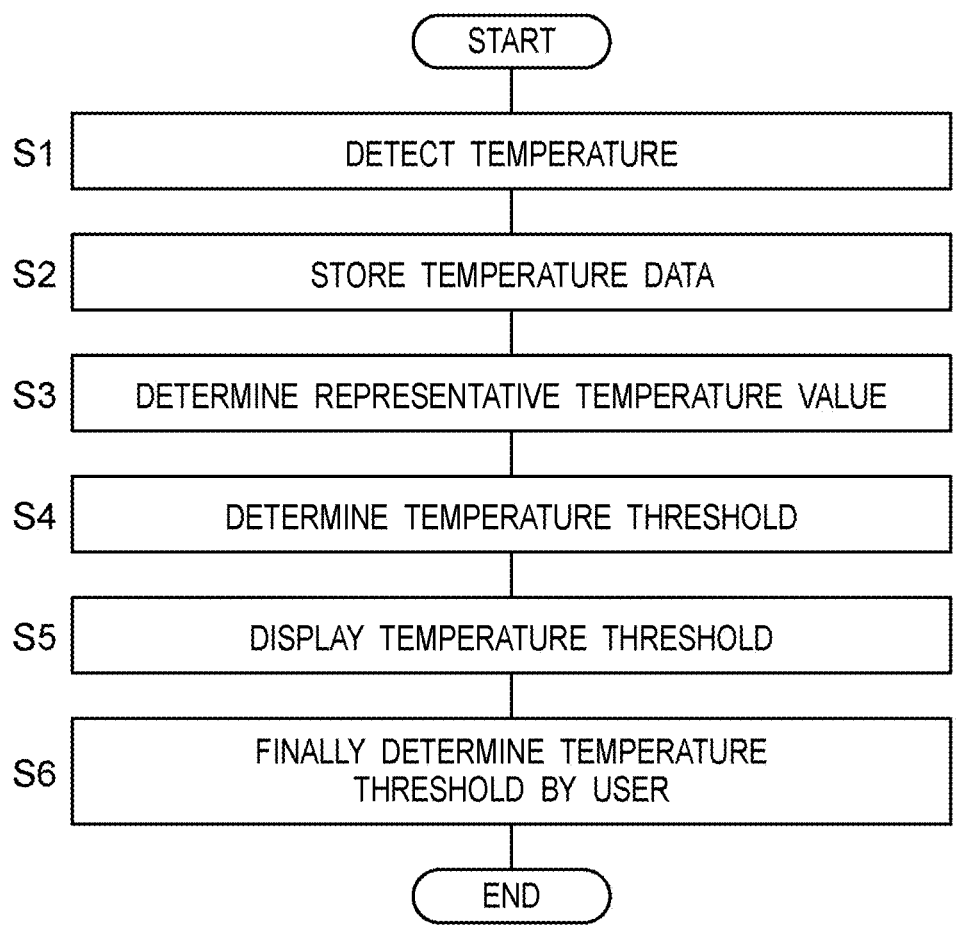
FIG. 4 is a flowchart illustrating a temperature threshold determining operation of the temperature abnormality determining device of FIG. 3.

First, the operation of the temperature abnormality determining device 30 (more specifically, the temperature threshold determining device in the temperature abnormality determining device 30) to determine the temperature threshold Tth is described with reference to the flowchart shown in FIG. 4.

The temperature sensor 20 detects the temperature of the target apparatus 10 during the test operation (step S1). Then, the temperature sensor 20 transmits the detection result as temperature data to the temperature abnormality determining device 30. It can be understood that the temperature data detected in step S1 is the temperature data indicating the temperature during the past operation of the target apparatus 10. Note that in step S1, the another temperature sensor 98 may detect the temperature of the ambient air 93 in the control board 90 during the test operation. Then, the another temperature sensor 98 may transmit the detection result as ambient temperature data to the temperature abnormality determining device 30.

Now, in the present embodiment, a case in which the temperature threshold Tth is determined based on the temperature of the target apparatus 10 during the test operation is described. However, for example, the temperature threshold Tth may be determined based on the temperature of the target apparatus 10 during the actual operation, which is performed before the abnormal temperature determining operation described later.

Note that in step S1, the temperature sensor 20 detects the temperature of the target apparatus 10 a plurality of times. The temperature sensor 20 may transmit the temperature data to the temperature abnormality determining device 30 each time the temperature is detected. Alternatively, the temperature sensor 20 may collectively transmit the plurality of pieces of temperature data acquired during the test operation to the temperature abnormality determining device 30 after the test operation in step S1 is completed.

The data acquisition unit 31 of the temperature abnormality determining device 30 receives the transmitted temperature data. Then, the control unit 37 transmits the temperature data received by the data acquisition unit 31 to the temperature data storage unit 35. The temperature data storage unit 35 stores the received temperature data (step S2).

Figure 5:
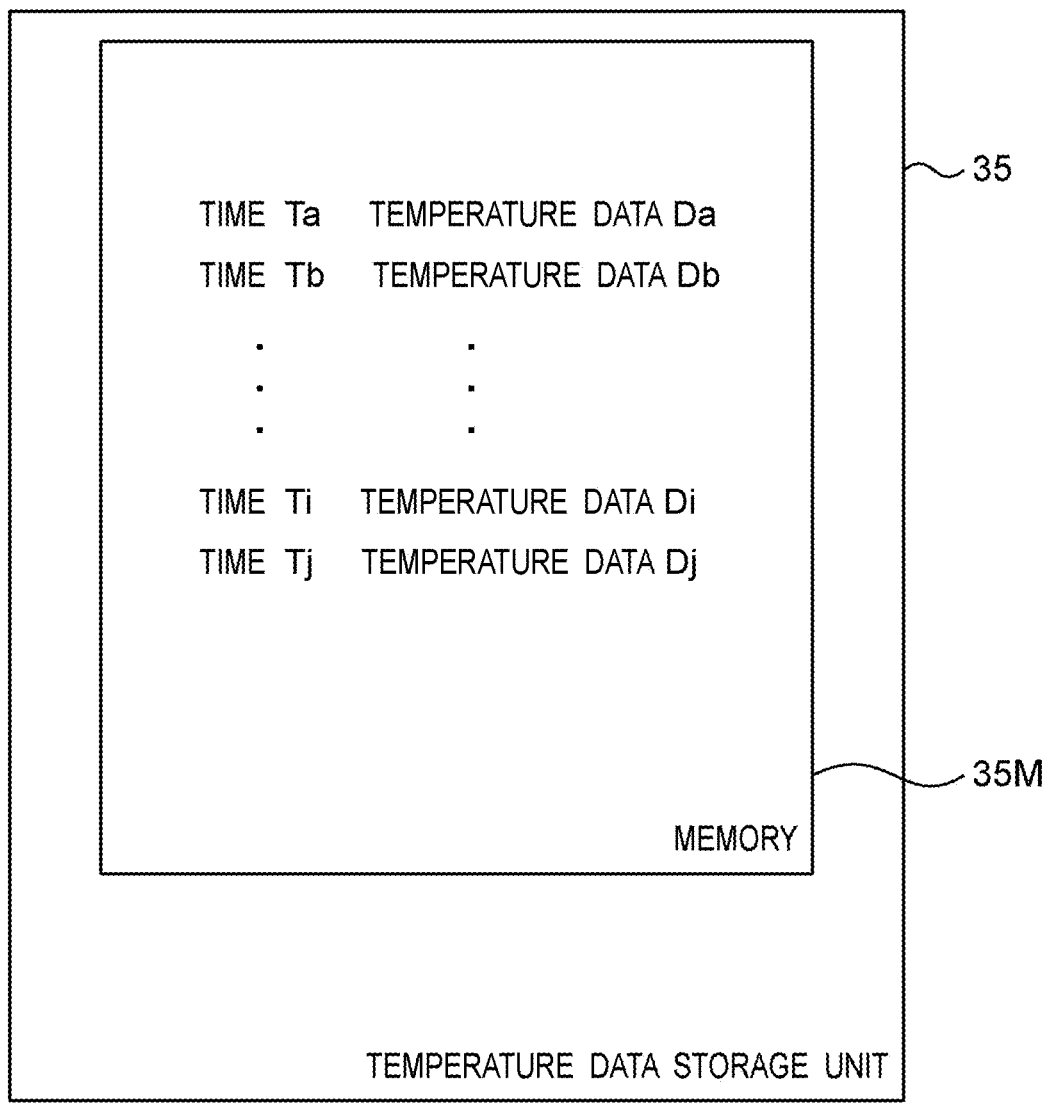
FIG. 5 is a diagram showing how temperature data is stored in a temperature data storage unit included in the temperature abnormality determining device of FIG. 3.

FIG. 5 conceptually illustrates how the temperature data storage unit 35 stores the plurality of pieces of temperature data. Note that the temperature data shown in FIG. 5 is the data detected and generated during the test operation of the target apparatus 10. As shown in FIG. 5, the temperature data storage unit 35 has a memory 35M. As shown in FIG. 5, a plurality of pieces of temperature data are stored in time series in the memory 35M.

In the example of FIG. 5, the temperature data is arranged in chronological order in the memory 35M from the top to the bottom of FIG. 5 (from time Ta to time Tj). Further, in the example of FIG. 5, the temperature data Da indicates the temperature of the target apparatus 10 detected at the time Ta. Similarly, for example, the temperature data Db indicates the temperature of the target apparatus 10 detected at time Tb, and the temperature data Dj indicates the temperature of the target apparatus 10 detected at time Tj. Therefore, for example, the temperature data Da is detected and generated earlier in time than the temperature data Db. At this time, the temperature data stored in the temperature data storage unit 35 may be, for example, deleted after a predetermined time period, and the temperature data newly transmitted may be newly stored in the data storage unit 35.

Next, the representative temperature value determining unit 37a determines a representative temperature value (hereinafter referred to as a representative temperature value Trep) of the target apparatus 10 during the past operation by using the temperature data stored in the temperature data storage unit 35. (Step S3). In step S3, the representative temperature value determining unit 37a reads a plurality of temperature values from the plurality of pieces of temperature data stored in the temperature data storage unit 35. Then, for example, the representative temperature value determining unit 37a determines the highest temperature value among the plurality of temperature values as the representative temperature value Trep. In addition, unlike the above, the representative temperature value determining unit 37a may calculate a statistical value such as the average value or the standard deviation from the plurality of temperature values, and determine the statistical value as the representative temperature value Trep. Further, the representative temperature value determining unit 37a may determine the representative temperature value Trep by using all the temperature data stored in the temperature data storage unit 35. Alternatively, the representative temperature value determining unit 37a may determine the representative temperature value Trep by using a part of the temperature data stored in the temperature data storage unit 35. In this case, a part of the temperature data may be selected by the user through the operation unit 33.

The representative temperature value determining unit 37a transmits the representative temperature value Trep to the temperature threshold determining unit 37b. Then, the temperature threshold determining unit 37b determines at least one temperature threshold Tth by using the representative temperature value Trep and a reference temperature value (hereinafter, referred to as a reference temperature value Tref) (step S4). Note that the reference temperature value Tref is the reference value that is preset and configured to prevent the temperature abnormality. The reference temperature value Tref is set by the user in the information storage unit 34 of the temperature abnormality determining device 30 based on such as an empirical rule. For example, the reference temperature value Tref may be the temperature at which the apparatus starts to be damaged by heat generation (which may prevent normal operation). As an example, the reference temperature value Tref is 100° C.

In step S4, the temperature threshold determining unit 37b calculates the temperature threshold Tth by, for example, a calculation formula shown by the following equation (1).

$$Tth = (Tref - Trep) \times k + (Trep) \quad (1)$$

Here, "k" is a coefficient that is preset in the temperature abnormality determining device 30. Further, as described above, "Tref" is the reference temperature value, and "Trep" is the representative temperature value.

The above equation (1) is preset in the information storage unit 34. The user determines in advance the coefficient k as a real number in a range of $0 \leq k \leq 1$ based on such as an empirical rule. In the description here, it is assumed that two coefficients k1 and k2 are preset in the temperature abnormality determining device 30 as the coefficient k. For example, 0.2 can be adopted as the first coefficient k1 and 0.5 can be adopted as the second coefficient k2.

It is assumed that the coefficients k1 (=0.2) and k2 (=0.5) are set, the representative temperature value Trep is 50° C., and the reference temperature value Tref is 100° C. In this case, when the coefficient k1 is 0.2, the temperature threshold determining unit 37b calculates a first temperature threshold Tth1 by the above equation (1).

$$Tth1 = (100° C. - 50° C.) \times 0.2 + 50° C. = 60° C.$$

Further, in the above case, when the coefficient k2 is 0.5, the temperature threshold determining unit 37b calculates a second temperature threshold Tth2 by the above equation (1).

$$Tth2 = (100° C. - 50° C.) \times 0.5 + 50° C. = 75° C.$$

As described above, in the above case, the temperature threshold determining unit 37b calculates the first temperature threshold Tth1 and the second temperature threshold Tth2 which is larger than the first temperature threshold Tth1.

The following formula (2) may be adopted instead of the above formula (1). That is, the temperature threshold determining unit 37b may calculate the temperature threshold Tth by a calculation formula shown by the following equation (2).

$$Tth = (Tref - (Trep - (Trefe - Tpmaxr)) \times h + Trep - (Trefe - Tpmaxr) \quad (2)$$

Here, "h" is a coefficient that is preset in the temperature abnormality determining device 30. The coefficient h is a real number in the range of $0 \leq h \leq 1$. Further, as described above, "Tref" is the reference temperature value, and "Trep" is the representative temperature value.

"Trefe" is the temperature indicated by the ambient air 93 around the target apparatus 10 in the casing of the control board 90 in which the target apparatus 10 is arranged, and is assumed to be the maximum. "Tpmaxr" is the maximum temperature among the temperature of the ambient air 93 in the control board 90 during the test operation measured by the another temperature sensor 98 in step S1 (in other words, the maximum temperature among the temperature of the ambient air 93 of the target apparatus 10 during the past operation).

The above equation (2) is preset in the information storage unit 34. The user presets the coefficient h and "Trefe" based on such as an empirical rule. The equation (2) includes variables related to the temperature of the ambient air 93 in the control board 90 (target apparatus 10). Therefore, it becomes possible to set the temperature threshold Tth corresponding to seasonal variations.

In step S4, the temperature threshold determining unit 37b transmits the temperature thresholds Tth1 and Tth2 calculated (determined) by the temperature threshold determining unit 37*b* to the display unit 32. Then, the display unit 32 visually displays the received temperature thresholds Tth1 and Tth2 (step S5).

Next, the user determines whether or not the temperature thresholds Tth1 and Tth2 displayed on the display unit 32 are used for determining whether or not the temperature abnormality has occurred in the target apparatus (in other words, for an abnormal temperature determining operation described later) (step S6). Specifically, the user inputs a final determination instruction to the operation unit 33 which is the instruction receiving unit (step S6).

It is assumed that the operation unit 33 receives an instruction from the user that the temperature thresholds Tth1 and Tth2 displayed on the display unit 32 are used in the abnormal temperature determining operation described later. In this case, in step S4, the temperature thresholds Tth1 and Tth2 calculated (determined) by the temperature threshold determining unit 37*b* are transmitted to the information storage unit 34 and the comparison unit 37*c*. In the case of the information storage unit 34 storing temperature thresholds Tth1*d* and Tth2*d* as default, the information storage unit 34 replaces the temperature thresholds Tth1 and Tth2 calculated in step S4 with the default values Tth1*d* and Tth2*d*. The information storage unit 34 stores the temperature thresholds Tth1 and Th2 until the next rewriting processing is executed. The rewriting processing occurs when the temperature threshold Tth is newly calculated in step S4, or when the user manually sets the temperature threshold Tth. In addition, the comparison unit 37*c* uses the temperature thresholds Tth1 and Th2 to perform the abnormal temperature determining operation described later.

The above steps S5 and S6 may be omitted. That is, the temperature thresholds Tth1 and Tth2 calculated in steps S1 to S4 may be automatically used as the temperature thresholds for the abnormality determining operation described later.

(Abnormal Temperature Determining Operation)

Figure 6:
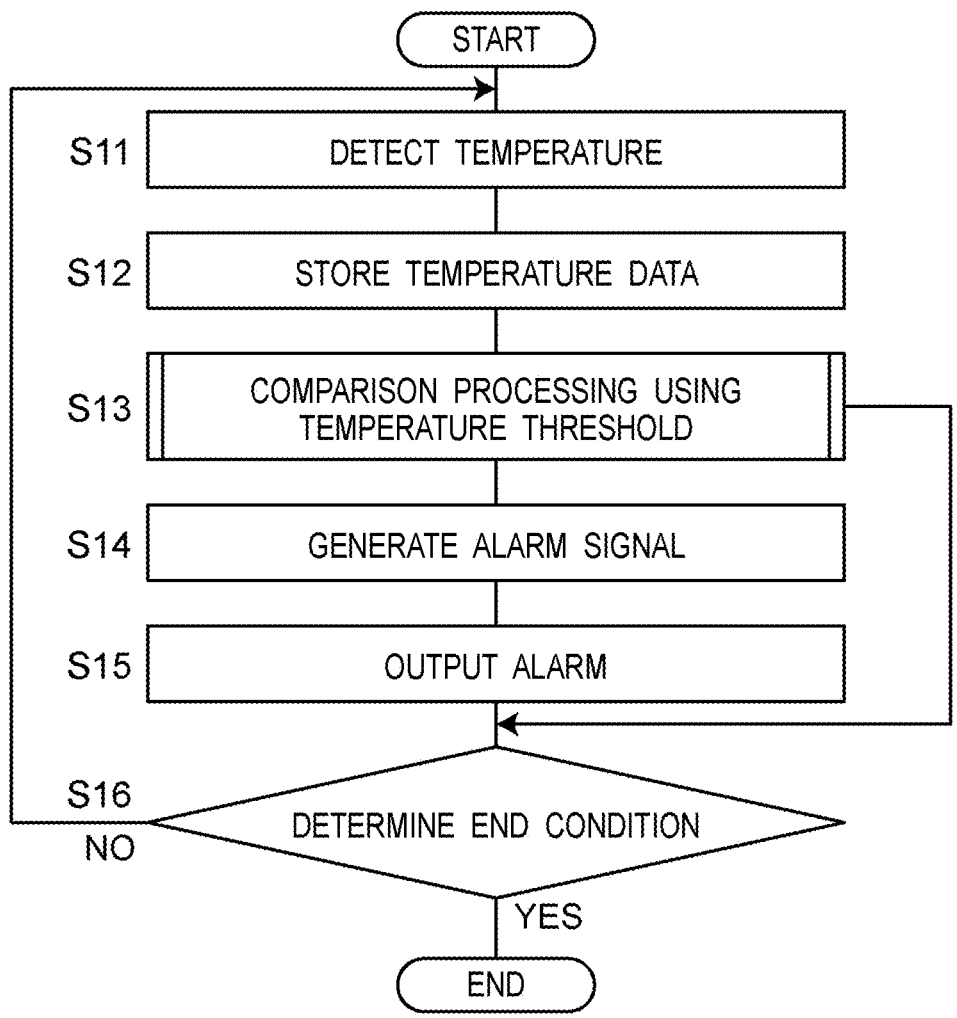
FIG. 6 is a flowchart illustrating an abnormal temperature determining operation of the temperature abnormality determining device of FIG. 3.

Next, an operation in which the temperature abnormality determining device 30 determines the abnormal temperature of the target apparatus 10 using the temperature threshold Tth is described with reference to the flowchart shown in FIG. 6.

The temperature sensor 20 detects the temperature of the target apparatus 10 during the current actual operation (step S11). Then, the temperature sensor 20 transmits the detection result as temperature data to the temperature abnormality determining device 30. It can be understood that the temperature data detected in step S11 is the temperature data indicating the temperature of the target apparatus 10 during the current operation of the target apparatus 10.

The temperature sensor 20 transmits the temperature data to the temperature abnormality determining device 30 via the signal cable 50. The data acquisition unit 31 of the temperature abnormality determining device 30 receives the transmitted temperature data. Then, the control unit 37 transmits the temperature data received by the data acquisition unit 31 to the temperature data storage unit 35 and the comparison unit 37*c* of the control unit 37. The temperature data storage unit 35 stores the received temperature data (step S12). The temperature data stored in the temperature data storage unit 35 may be used when the temperature threshold Tth is determined again in the future.

The comparison unit 37*c* compares the temperature data detected and generated in step S11 (which can be understood as the temperature data during the current operation of the target apparatus 10) with the temperature thresholds Tth1 and Tth2 (step S13). Specifically, the comparison unit 37*c* determines whether or not the temperature data is equal to the temperature thresholds Tth1 and Tth2 or more (step S13). Further, the comparison unit 37*c* generates an alarm signal according to the result of the comparison (step S14).

Figure 7:
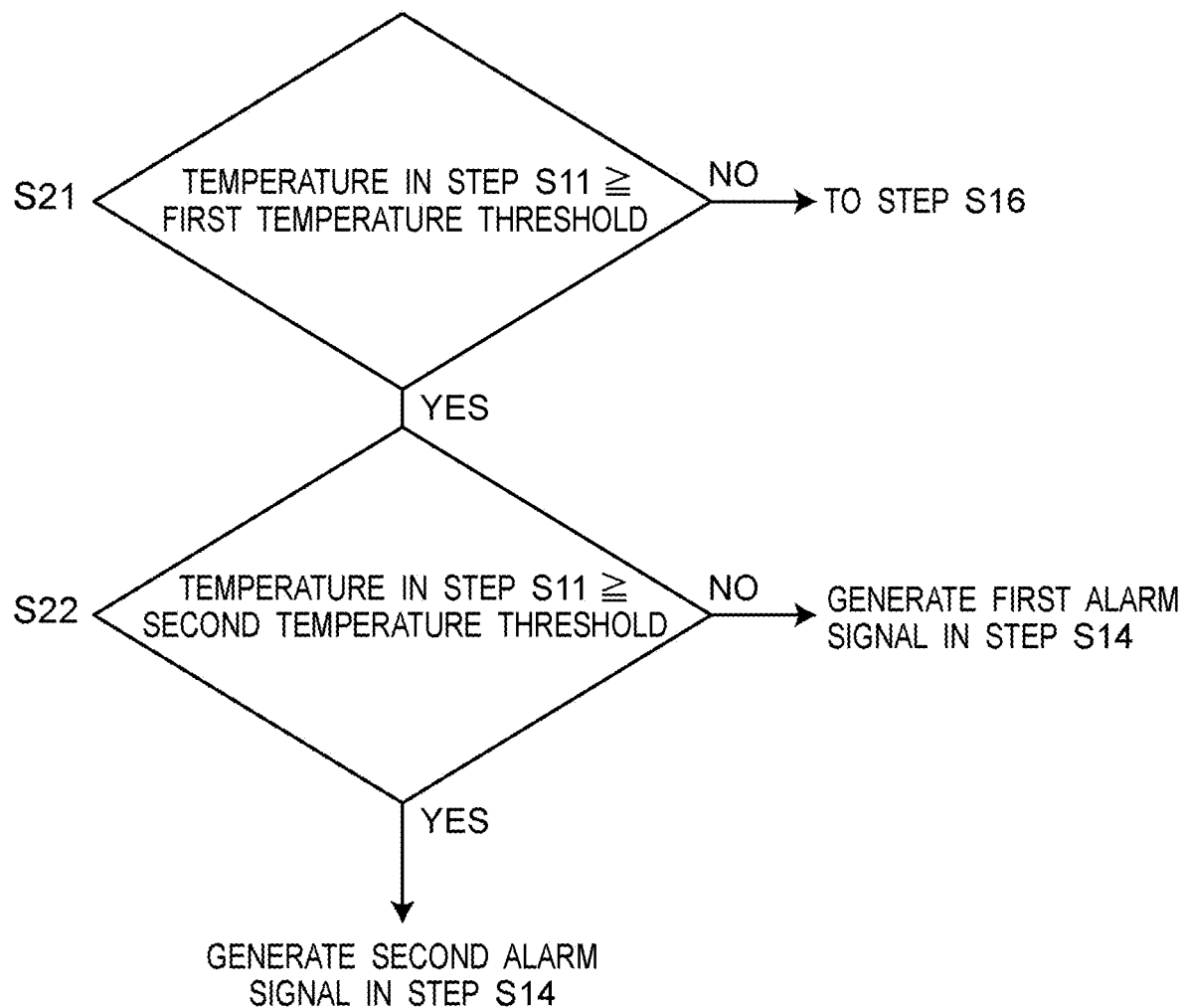
FIG. 7 is a flowchart illustrating a specific example of comparison processing using a temperature threshold performed by a control unit included in the temperature abnormality determining device of FIG. 3.

FIG. 7 shows an example of specific operations of steps S13 and S14. Here, for example, as described above, it is assumed that two temperature thresholds Tth1 and Tth2 are set in the temperature abnormality determining device 30. Here, the two temperature thresholds Tth1 and Tth2 are the first temperature threshold Tth1 and the second temperature threshold Tth2, and the second temperature threshold Tth2 is higher (larger) than the first temperature threshold Tth1.

In the above case, referring to FIG. 7, the comparison unit 37*c* determines whether or not the temperature detected in step S11 is equal to the first temperature threshold Tth1 or more (step S21). Here, it can be understood that the temperature detected in step S11 is the temperature indicated by the target apparatus 10 during the current operation of the target apparatus 10.

It is assumed that the comparison unit 37*c* determines that the temperature detected in step S11 is less than the first temperature threshold Tth1 ("NO" in step S21). In this case, the temperature abnormality determining device 30 proceeds to step S16. On the other hand, it is assumed that the comparison unit 37*c* determines that the temperature detected in step S11 is equal to the first temperature threshold Tth1 or more ("YES" in step S21). In this case, the temperature abnormality determining device 30 proceeds to step S22.

In step S22, the comparison unit 37*c* determines whether or not the temperature detected in step S11 is equal to the second temperature threshold Tth2 or more.

It is assumed that the comparison unit 37*c* determines that the temperature detected in step S11 is less than the second temperature threshold Tth2 ("NO" in step S22). That is, the temperature detected in step S11 is equal to the first temperature threshold Tth1 or more and lower than the second temperature threshold Tth2. In this case, the comparison unit 37*c* generates a first alarm signal (step S14). For example, the first alarm signal is an alarm signal indicating a warning.

On the other hand, it is assumed that the comparison unit 37*c* determines that the temperature detected in step S11 is equal to the second temperature threshold Tth2 or more ("YES" in step S22). In this case, the comparison unit 37*c* generates a second alarm signal (step S14). For example, the second alarm signal is an alarm signal indicating a content having a higher warning level than the first alarm signal.

As described above, in the process including steps S13 (steps S21 and S22) and S14, the comparison unit 37*c* determines whether or not the temperature detected in step S11 is equal to at least one temperature threshold Tth1 or Tth2 or more to determine whether or not the temperature abnormality has occurred in the target apparatus 10.

In step S14, after the alarm signal is generated, the comparison unit 37*c* transmits the generated alarm signal to the alarm unit 36. Then, the alarm unit 36 executes a predetermined alarm output according to the received alarm signal (step S15).

For example, it is assumed that the alarm unit 36 receives the first alarm signal indicating a warning. In this case, the temperature rise of the target apparatus 10 is becoming abnormal. Therefore, the alarm unit 36 outputs to the user a notification indicating a warning (step S15). The user who has received the notification does not need to replace the target apparatus 10 immediately, but can recognize in advance that the target apparatus 10 will need to be inspected in the near future.

For example, it is assumed that the alarm unit 36 receives the second alarm signal at an alarm level. In this case, the temperature of the target apparatus 10 has reached an abnormal level. Therefore, the alarm unit 36 outputs an alarm notification to the user (step S15). The user who has received the notification can immediately perform inspection, replacement, and the like of the target apparatus 10.

In step S16, the temperature abnormality determining device 30 (for example, the control unit 37) determines whether or not an end condition is satisfied. Here, the end condition may be preset in the temperature abnormality determining device 30. Alternatively, the end condition may be an end instruction from the user through the operation unit 33.

When the temperature abnormality determining device 30 determines that the end condition is satisfied ("YES" in step S16), the abnormal temperature determining operation ends. On the other hand, when the temperature abnormality determining device 30 determines that the end condition is not satisfied ("NO" in step S16), the steps after step S11 are restarted.

(Effects)

As described above, in the temperature abnormality determining device 30 according to the present embodiment, the representative temperature value determining unit 37a determines the representative temperature value Trep during the past operation of the target apparatus 10 based on the temperature data stored in the temperature data storage unit 35. Then, by using the representative temperature value Trep and the reference temperature value Tref that is preset and configured to prevent the temperature abnormality, the temperature threshold determining unit 37b determines at least one temperature threshold Tth (or Tth1 or Tth2. Hereinafter, unless otherwise specified, these thresholds are collectively referred to as Tth). That is, the temperature threshold setting device 30 determines the temperature threshold Tth by using the reference temperature value Tref that is preset and configured to prevent the temperature abnormality. The reference temperature value Tref can optimize the temperature threshold Tth that is determined, even when the target apparatus 10 does not operate normally (for example, when the variation in the temperature measurement result of the target apparatus 10 is extremely large or small) during the past operation (for example, the test operation for determining the temperature threshold Tth) of the target apparatus 10, from the viewpoint of preventing the temperature abnormality. Therefore, according to the temperature abnormality determining device 30, an appropriate temperature threshold Tth can be determined. As a result, for example, during the current operation (actual operation) of the target apparatus 10, it becomes possible to accurately determine whether or not the temperature abnormality has occurred in the target apparatus 10, depending on whether or not the temperature indicated by the target apparatus 10 is equal to the temperature threshold Tth or more. Further, the temperature abnormality determining device 30 according to the present embodiment determines the temperature threshold Tth by using the reference temperature value Tref. Therefore, for example, an appropriate temperature threshold Tth can be determined even if there is only small amount of temperature data used to obtain the representative temperature value Trep. Therefore, for example, it becomes possible to shorten the test period of collecting the temperature data necessary for obtaining the representative temperature value Trep.

Figure 8:
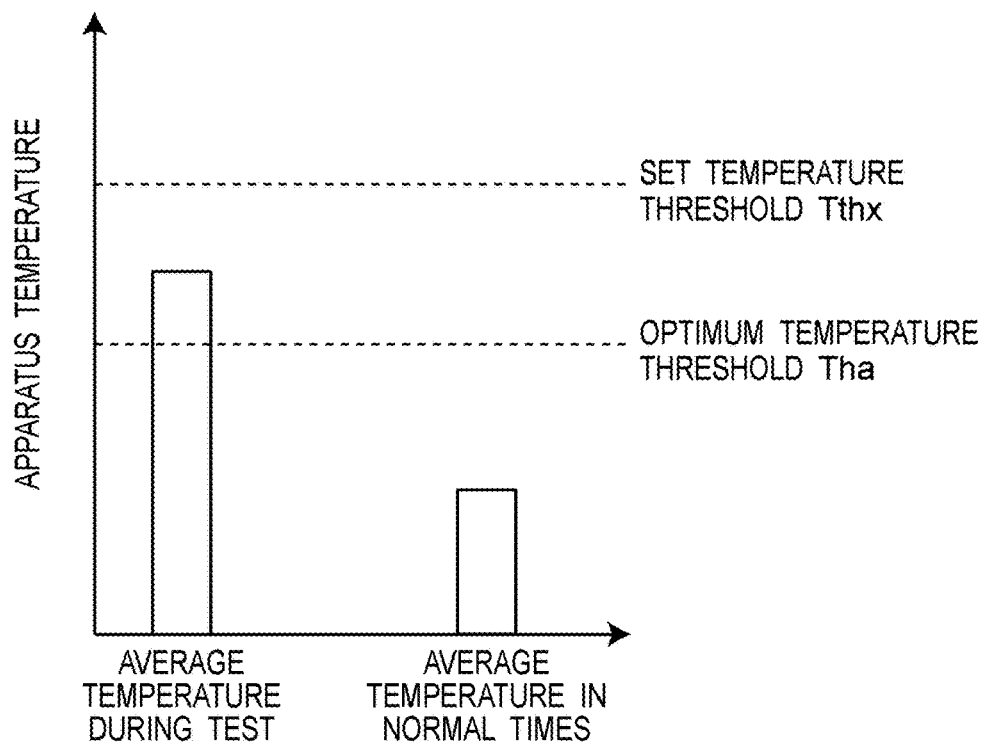
FIG. 8 is a diagram illustrating a problem assumed when the temperature threshold is set using the standard deviation of the detected temperature without using a reference temperature value (problem when temperature of a target apparatus is high during a test).
Figure 9:
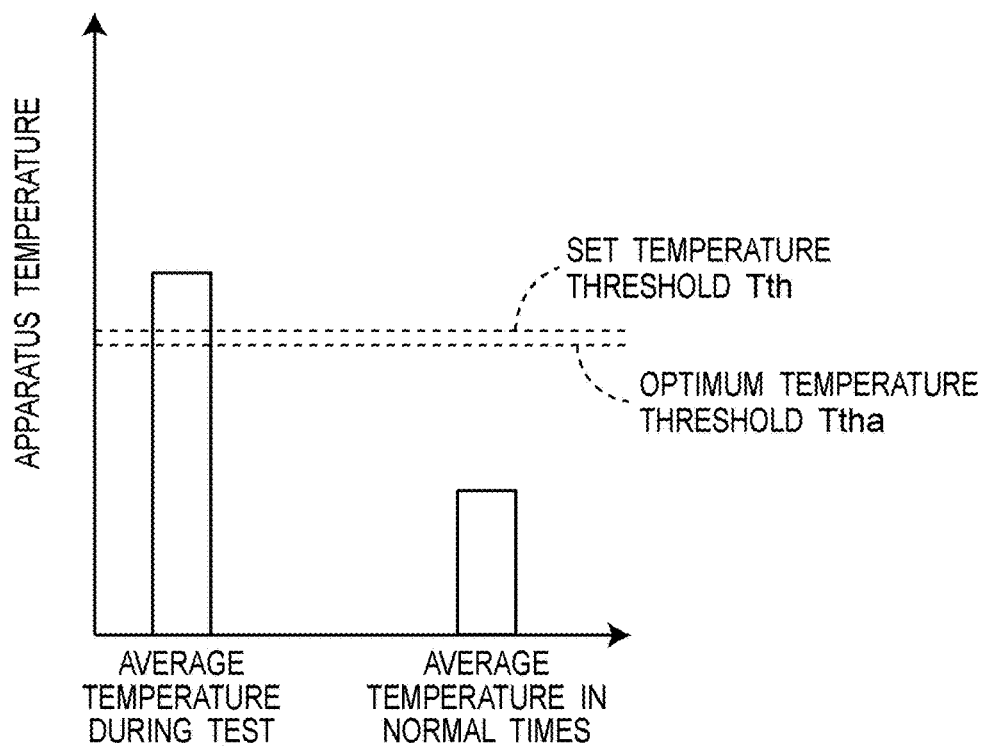
FIG. 9 is a diagram illustrating that the temperature abnormality determining device according to the embodiment determines an appropriate temperature threshold even when the temperature of the target apparatus is high during the test.

It is assumed that the temperature is detected for the target apparatus 10 during the test operation, and the temperature threshold is set by using only the standard deviation of the detection result and not using the reference temperature value Tref. For example, when the target apparatus 10 during the test operation is hot, a set temperature threshold Tthx may be set to a value considerably higher than an optimum threshold Ttha (see FIG. 8). In this case, in normal times, the average temperature is considerably lower than the temperature threshold Tthx. Therefore, even though the temperature of the target apparatus 10 has reached an abnormal level, a situation may occur in which the temperature is not determined to be abnormal. However, in the present embodiment, the temperature threshold is determined also by using the reference temperature value Tref. Therefore, for example, even when the target apparatus 10 is always at a high temperature during the test operation, a set temperature threshold Tth is adjusted to approach the optimum threshold Ttha (see FIG. 9).

Figure 10:
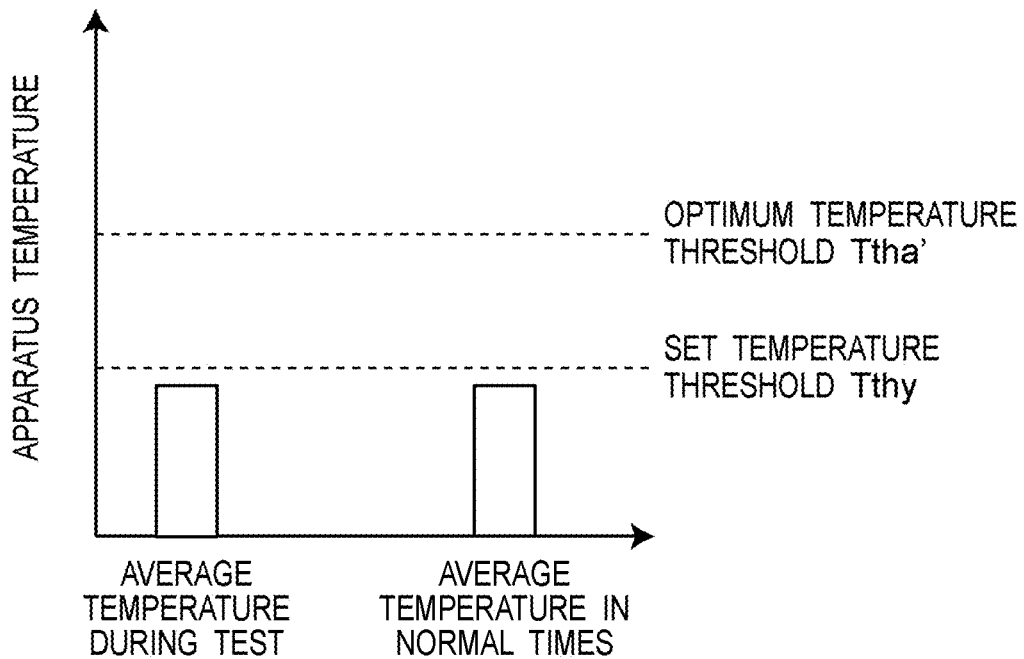
FIG. 10 is a diagram illustrating a problem assumed when the temperature threshold is set using the standard deviation of the detected temperature without using the reference temperature value (problem when the temperature variation of the target apparatus is small during the test).
Figure 11:
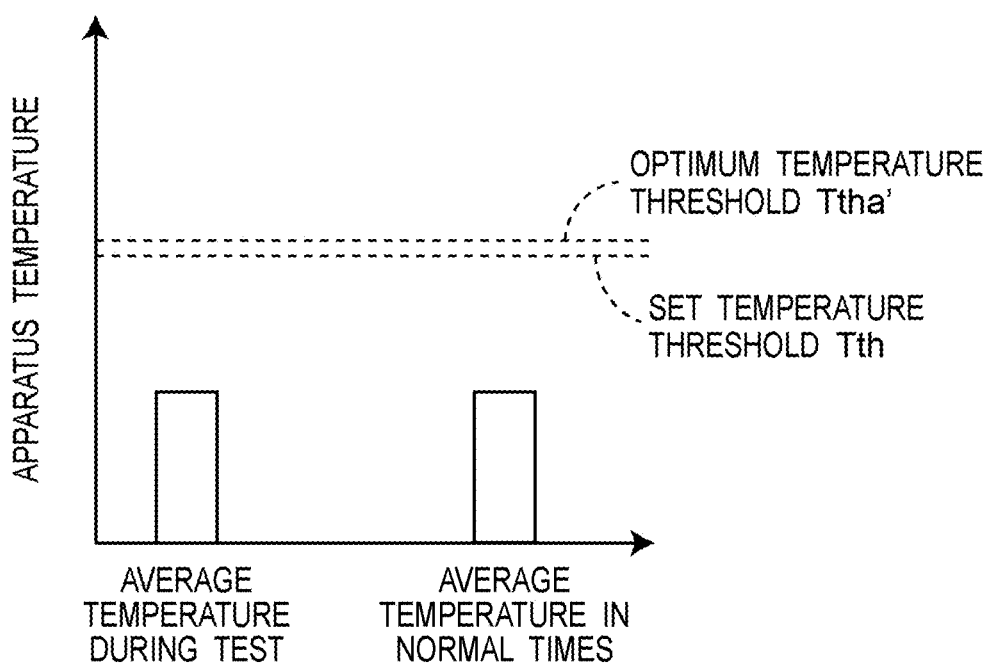
FIG. 11 is a diagram illustrating that the temperature abnormality determining device according to the embodiment determines an appropriate temperature threshold even when the temperature variation of the target apparatus is small during the test.

Further, it is assumed that the temperature variation of the target apparatus 10 during the test operation is extremely small. In this case, when the temperature threshold is set using only the standard deviation of the temperature detection result of the target apparatus 10 and not using the reference temperature value Tref, a set temperature threshold Tthy may be set considerably lower than an optimum threshold Ttha' as shown in FIG. 10. In this case, in normal times, even when the temperature of the target apparatus 10 rises only slightly, a situation may occur in which the temperature is determined to be abnormal even though the abnormal level has not yet been reached. However, in the present embodiment, the temperature threshold Tth is determined also by using the reference temperature value Tref. Therefore, for example, even when the temperature variation of the target apparatus 10 during the test operation is extremely small, the set temperature threshold Tth is adjusted to approach the optimum value (see FIG. 11).

Further, in the temperature abnormality determining device 30 of the present embodiment, the comparison unit 37c generates the alarm signal according to the result of the above comparison. Therefore, a terminal or the like that has received the alarm signal can output a notification such as a warning or caution based on the alarm signal.

Further, in the temperature abnormality determining device 30 of the present embodiment, the representative temperature value determining unit 37a may determine the highest temperature value among the past measurement results as the representative temperature value Trep. Therefore, it is possible to adopt an appropriate representative temperature value Trep in order to determine whether or not the temperature abnormality has occurred in the target apparatus 10.

Further, in the temperature abnormality determining device 30 of the present embodiment, the temperature threshold determining unit 37b calculates the temperature threshold Tth by the equation (1). Therefore, an appropriate temperature threshold Tth can be determined by a simple method.

Further, in the temperature abnormality determining device 30 of the present embodiment, the comparison unit 37c generates the first alarm signal when the temperature indicated by the target apparatus 10 during the current operation of the target apparatus 10 is equal to the first temperature threshold Tth1 or more and less than the second temperature threshold Tth2. Further, the comparison unit 37c generates the second alarm signal indicating the content having a higher warning level than the first alarm signal when the temperature indicated by the target apparatus 10 during the current operation of the target apparatus 10 is equal to the second temperature threshold Tth2 or more. As described above, in the temperature abnormality determining device 30 of the present embodiment, the comparison unit 37c generates different types of alarm signals as a result of comparison using the different temperature thresholds Tth1 and Tth2. Therefore, for example, when the temperature indicated by the target apparatus 10 is equal to the first temperature threshold Tth1 or more and less than the second temperature threshold Tth2 during the current operation of the target apparatus 10, the first alarm signal indicating a warning is generated. Further, when the temperature value of the target apparatus 10 is equal to the second temperature threshold Tth2 or more, the second alarm signal indicating the content having a higher warning level than the warning can be generated.

(Result of Verification Experiment)

Using the above calculation formula (the above equation (1)), the inventors conducted an energization test in which the temperature abnormality of the target apparatus 10 arranged in the control board 90 was reproduced. The results of the verification experiment by the temperature abnormality determining device 30 are shown as a table in FIG. 12. In the experiment, the temperature of the target apparatus 10 at the time of starting the energization test was 25° C. Further, in the energization test, the reference temperature value Tref was set to 100° C., the coefficient k1 was set to 0.35 (that is, the first temperature threshold Tth1 was set to 54.5° C.), and the coefficient k2 was set to 0.6 (that is, the second temperature threshold Tth2 was set to 72° C.).

As shown in FIG. 12, about 30 minutes after the start of the energization test, the temperature of the target apparatus 10 reached 54.5° C., which is the first temperature threshold Tth1. At this point, the user was able to know the signs of temperature abnormality, while at this point, no particular change due to the temperature rise was observed in the target apparatus 10. About one hour after the start of the energization test, the temperature of the target apparatus 10 reached 72° C., which is the second temperature threshold Tth2. At this point, the user can determine that the temperature abnormality has occurred in the target apparatus 10 and can take some action on the target apparatus 10. On the other hand, even at this time point, no particular change due to the temperature rise was observed in the target apparatus 10. Furthermore, as a result of continuing to leave the temperature rise of the target apparatus 10 unattended, the target apparatus 10 reached 100° C., which is the same as the reference temperature value Tref. According to an empirical rule, if the target apparatus 10 reaches 100° C., some physical damage should be observed in the target apparatus 10. However, in this energization test, no particular change due to temperature rise was observed in the target apparatus 10 even at that time. The inventors assume that this was due to the margin. Further, as a result of continuing to leave the temperature rise of the target apparatus 10 unattended, the target apparatus 10 reached 120° C. At that time, a remarkable physical abnormality due to the temperature rise was observed in the target apparatus 10.

Further, the temperature abnormality determining device 30 of the present embodiment further includes the instruction receiving unit that receives an instruction from the user. Therefore, the user can freely change the temperature threshold Tth to an optional value by operating the instruction receiving unit.

(Modification)

In the above embodiment, the temperature abnormality determining device 30 has the comparison unit 37c and an alarm unit 36. However, the comparison unit 37c and the alarm unit 36 may be provided separately from the temperature abnormality determining device 30.

Figure 13:
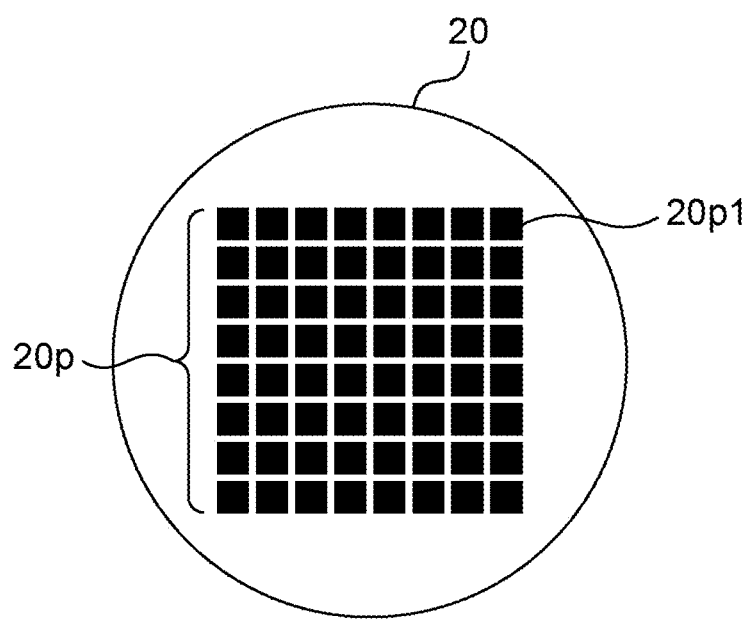
FIG. 13 is a diagram showing a temperature sensitive element array included in the temperature sensor of FIG. 1.

Further, the temperature sensor 20 may include a temperature sensitive element array 20p shown in FIG. 13. In this example, the temperature sensitive element array 20p is composed of a thermopile, and is constituted of a plurality of temperature sensitive elements 20p1 arranged in 8 rows×8 columns. Respective temperature sensitive elements 20p1 detect the temperature at different portions of the target apparatus 10. When the temperature sensor 20 has the temperature sensitive element array 20p shown in FIG. 13, the temperature abnormality determining device 30 may determine the corresponding temperature threshold Tth for each of the temperature sensitive elements 20p1. Further, the temperature abnormality determining device 30 and the temperature abnormality determining device 40 may determine whether or not the temperature abnormality has occurred in each portion of the target apparatus 10 according to the measurement result from each of the temperature sensitive elements 20p1.

The methods including the temperature threshold determining method (FIG. 4) and the temperature abnormality determining method (FIGS. 6 and 7) may be recorded as software (computer program) in a recording media that can store data in a non-transitory manner, such as a compact disc (CD), a digital versatile disc (DVD), or a flash memory. By installing the software recorded on the recording medium as such on practical computer devices such as personal computers, personal digital assistances (PDAs), and smartphones, the temperature threshold determining method and the temperature abnormality determining method can be executed in the above computer devices.

Further, in the above-described embodiment, the control unit 37 includes a CPU, but the present invention is not limited to this. The control unit 37 may include a logic circuit (integrated circuit) such as a programmable logic device (PLD) or a field programmable gate array (FPGA).

The above embodiments are exemplifications, and various modifications can be made without departing from the scope of the present invention. The plurality of embodiments described above can be independently established, but the embodiments can be combined with each other. Further, although various features in different embodiments can be established independently, it is also possible to combine features in different embodiments.

In the present description, the "target apparatus" refers to an apparatus that is a target of temperature measurement and whose temperature may rise during operation.

"During the past operation" means during operation before the time of current operation, and refers to, for example, during the test operation.

The "representative temperature value" refers to, such as a statistical value obtained from the temperature data, but may be characteristic data (for example, the maximum temperature value) in a plurality of pieces of temperature data.

The "reference temperature value" is a reference value preset, based on such as an empirical rule, by a user to prevent the temperature abnormality. For example, the "reference temperature value" may be the temperature at which the apparatus starts to be damaged by heat generation.

In the temperature threshold determining device of the present embodiments, the temperature data storage unit stores temperature data indicating the temperature of the target apparatus during the past operation. The representative temperature value determining unit determines a representative temperature value during the past operation of the target apparatus based on the temperature data stored in the temperature data storage unit. Then, the temperature threshold determining unit determines at least one temperature threshold by using the representative temperature value during the past operation and the reference temperature value that is preset and configured to prevent the temperature abnormality. That is, the temperature threshold setting device determines the temperature threshold using the reference temperature value that is preset and configured to prevent the temperature abnormality. The reference temperature value can optimize the temperature threshold that is determined, even when the target apparatus does not operate normally (for example, when the variation in the temperature measurement results of the target apparatus is extremely large or small) during the past operation (for example, the test operation for determining the temperature threshold) of the target apparatus, from the viewpoint of preventing the temperature abnormality. Therefore, according to the temperature threshold determining device, an appropriate temperature threshold can be determined. As a result, for example, it is possible to accurately determine whether or not the temperature abnormality has occurred in the target apparatus, depending on whether or not the temperature indicated by the target apparatus exceeds the temperature threshold during the current operation (actual operation) of the target apparatus.

In the temperature threshold determining device of one embodiment,
the representative temperature value determining unit is configured to
read a plurality of temperature values from a plurality of pieces of temperature data stored in the temperature data storage unit, and determine the highest temperature value among the plurality of temperature values as the representative temperature value.

In the temperature threshold determining device of the one embodiment, the representative temperature value determining unit determines the highest temperature value among the past measurement results as the representative temperature value. Therefore, it becomes possible to adopt an appropriate representative temperature value in order to determine whether or not the temperature abnormality has occurred in the target apparatus.

In the temperature threshold determining device of one embodiment, when the reference temperature value is Tref, the representative temperature value is Trep, and the at least one temperature threshold is Tth, the at least one temperature threshold Tth is calculated by the formula $$Tth=(Tref-Trep) \times k+(Trep),$$

where k is a coefficient consisting of real numbers in a range of $0 \leq k \leq 1$.

The temperature threshold determining device of the one embodiment calculates the temperature threshold based on the above calculation formula. Therefore, an appropriate temperature threshold can be determined by a simple method.

In the temperature threshold determining device of one embodiment,
the target apparatus is arranged in a casing of a board, and
when the reference temperature value is denoted as Tref, the representative temperature value is denoted as Trep, the at least one temperature threshold is denoted as Tth,
the temperature indicated by ambient air around the target apparatus in the casing and assumed to be the maximum is denoted as Trefe, and
the maximum temperature of the ambient air during the past operation is denoted as Tpmaxr,
the at least one temperature threshold Tth is calculated by the following formula $$Tth=(Tref-(Trep-(Trefe-Tpmaxr))) \times h+Trep-(Trefe-Tpmaxr))$$

where, h is a coefficient consisting of real numbers in a range of $0 \leq h \leq 1$.

The temperature threshold determining device of the one embodiment calculates the temperature threshold based on the above calculation formula. The above formula contains variables related to the temperature of the ambient air around the target apparatus. Therefore, it becomes possible to set the temperature threshold Tth corresponding to seasonal variations.

The temperature threshold determining device of one embodiment further includes:
a display unit that displays the at least one temperature threshold determined by the temperature threshold determining unit; and
an instruction receiving unit that receives, as an instruction from the user, whether or not the at least one temperature threshold displayed on the display unit is used in determining whether or not the temperature abnormality has occurred in the target apparatus.

With the temperature threshold determining device of the one embodiment, the user can finally determine whether or not the temperature threshold determined by the temperature threshold determining unit is used in determining whether or not the temperature abnormality has occurred in the target apparatus.

In another aspect, a temperature abnormality determining system of the present disclosure includes:
the temperature threshold determining device disclosed above;
a temperature sensor that detects temperature of the target apparatus; and
a comparison unit that compares the temperature data during the current operation of the target apparatus detected by the temperature sensor with the at least one temperature threshold, and generates at least one alarm signal according to a result of the comparison.

In the temperature abnormality determining system of the present disclosure, the temperature sensor detects the temperature of the target apparatus. The comparison unit compares the temperature data during the current operation of the target apparatus detected by the temperature sensor with the at least one temperature threshold, and generates the alarm signal according to the result of the comparison. Therefore, a terminal or the like that has received the alarm signal can output a notification such as a warning or caution based on the alarm signal.

In the temperature abnormality determining system of one embodiment,
the at least one temperature threshold includes:
a first temperature threshold; and
a second temperature threshold that is larger than the first temperature threshold, and
the comparison unit is configured to:
generate a first alarm signal as the alarm signal during the current operation of the target apparatus, when the temperature indicated by the target apparatus is equal to the first temperature threshold or more and less than the second temperature threshold; and generate a second alarm signal as the alarm signal during the current operation of the target apparatus, when the temperature indicated by the target apparatus is equal to the second temperature threshold or more, the second alarm signal indicating a content having a higher warning level than the first alarm signal.

In the temperature abnormality determining system of the one embodiment, the comparison unit generates different types of alarm signals as the result of comparison using different temperature thresholds. Therefore, for example, when the temperature indicated by the target apparatus is equal to the first temperature threshold or more and less than the second temperature threshold during the current operation of the target apparatus, the first alarm signal indicating a warning can be generated. Further, when the temperature value is equal to the second temperature threshold or more, the second alarm signal indicating the content having a higher warning level than the warning can be generated.

In another aspect, a temperature threshold determining method of the present disclosure determines a temperature threshold used to determine whether or not a target apparatus has a temperature abnormality, the method including:

storing temperature data indicating temperature of the target apparatus during past operation in a temperature data storage unit;

determining a representative temperature value of the target apparatus during the past operation, which is derived using the temperature data stored in the temperature data storage unit; and determining at least one temperature threshold by using the representative temperature value during the past operation and a reference temperature value that is preset and configured to prevent the temperature abnormality.

In the temperature threshold determining method of the present embodiments, the temperature data indicating the temperature of the target apparatus during the past operation is stored in the temperature data storage unit. Then, based on the temperature data stored in the temperature data storage unit, the representative temperature value of the target apparatus during the past operation is determined. Then, at least one temperature threshold is determined by using the representative temperature value during the past operation and the reference temperature value that is preset and configured to prevent the temperature abnormality. That is, in the temperature threshold setting method, the temperature threshold is determined using the reference temperature value that is preset and configured to prevent the temperature abnormality. The reference temperature value can optimize the temperature threshold that is determined, even when the target apparatus does not operate normally (for example, when the variation in the temperature measurement results of the target apparatus is extremely large or small) during the past operation (for example, the test operation for determining the temperature threshold) of the target apparatus, from the viewpoint of preventing the temperature abnormality. Therefore, according to this temperature threshold determining method, an appropriate temperature threshold can be determined. As a result, for example, it is possible to accurately determine whether or not the temperature abnormality has occurred in the target apparatus, depending on whether or not the temperature indicated by the target apparatus exceeds the temperature threshold during the current operation (actual operation) of the target apparatus.

In yet another aspect, a program of the present disclosure is a program for causing a computer to execute the temperature threshold determining method.

The above-described temperature threshold determining method can be carried out by causing a computer to execute the program of the present disclosure.

As is clear from the above, according to the temperature threshold determining device and the temperature threshold determining method of the present disclosure, when, for example, even when the target apparatus does not operate normally during the test operation performed on the target apparatus to determine the temperature threshold, an appropriate temperature threshold can be determined. Further, the above-described temperature threshold determining method can be carried out by causing a computer to execute the program of the present disclosure. Further, according to the temperature abnormality determining system of the present disclosure, it is possible to accurately determine whether or not the target apparatus has a temperature abnormality.

What is claimed is:

1. A temperature threshold determining device that determines at least one temperature threshold for the temperature of a target apparatus adapted to operate by receiving the electric power, wherein the at least one temperature threshold is used to determine whether or not a temperature abnormality has occurred in the target apparatus, the temperature threshold determining device comprising:

a temperature data storage unit storing temperature data that indicates temperature of the target apparatus during past operation;

a representative temperature value determining unit that determines a representative temperature value of the target apparatus during the past operation, which is derived using the temperature data stored in the temperature data storage unit;

a temperature threshold determining unit that determines the at least one temperature threshold for the temperature of the target apparatus by using the representative temperature value of the target apparatus during the past operation and a reference temperature value of the target apparatus that is preset at a predetermined temperature level at which the apparatus starts to be damaged;

a temperature sensor that detects temperature of the target apparatus; and a comparison unit that compares the temperature data during the current operation of the target apparatus detected by the temperature sensor with the at least one temperature threshold, and generates at least one alarm signal according to a result of the comparison, wherein when the reference temperature value is Tref, the representative temperature value is Trep, and the at least one temperature threshold is Tth, the at least one temperature threshold Tth is calculated by the formula $$Tth=(Tref-Trep)\times k+(Trep),$$

where k is a coefficient consisting of real numbers in a range of $0 \leq k \leq 1$.

2. The temperature threshold determining device according to claim 1, wherein the representative temperature value determining unit is configured to read a plurality of temperature values from a plurality of pieces of temperature data stored in the temperature data storage unit, and determine the highest temperature value among the plurality of temperature values as the representative temperature value.

3. The temperature threshold determining device according to claim 1 further comprising:
a display unit that displays the at least one temperature threshold determined by the temperature threshold determining unit; and
an instruction receiving unit that receives, as an instruction from the user, whether or not the at least one temperature threshold displayed on the display unit is used in determining whether or not the temperature abnormality has occurred in the target apparatus.

4. A temperature abnormality determining system comprising:
a temperature threshold determining device that determines at least one temperature threshold for the temperature of a target apparatus adapted to operate by receiving the electric power, wherein the at least one temperature threshold is used to determine whether or not a temperature abnormality has occurred in the target apparatus, the temperature threshold determining device comprising:
a temperature data storage unit storing temperature data that indicates temperature of the target apparatus during past operation;
a representative temperature value determining unit that determines a representative temperature value of the target apparatus during the past operation, which is derived using the temperature data stored in the temperature data storage unit; and
a temperature threshold determining unit that determines the at least one temperature threshold for the temperature of the target apparatus by using the representative temperature value of the target apparatus during the past operation and a reference temperature value of the target apparatus that is preset at a predetermined temperature level at which the apparatus starts to be damaged, wherein
when the reference temperature value is Tref, the representative temperature value is Trep, and the at least one temperature threshold is Tth, the at least one temperature threshold Tth is calculated by the formula $Tth=(Tref-Trep)\times k+(Trep),$ where k is a coefficient consisting of real numbers in a range of $0 \leq k \leq 1$;
a temperature sensor that detects temperature of the target apparatus; and
a comparison unit that compares the temperature data during the current operation of the target apparatus detected by the temperature sensor with the at least one temperature threshold, and generates at least one alarm signal according to a result of the comparison.

5. The temperature abnormality determining system according to claim 4, wherein
the at least one temperature threshold includes:
a first temperature threshold; and
a second temperature threshold that is larger than the first temperature threshold, and
the comparison unit is configured to:
generate a first alarm signal as the alarm signal during the current operation of the target apparatus, when the temperature indicated by the target apparatus is equal to the first temperature threshold or more and less than the second temperature threshold; and
generate a second alarm signal as the alarm signal during the current operation of the target apparatus, when the temperature indicated by the target apparatus is equal to the second temperature threshold or more, the second alarm signal indicating a content having a higher warning level than a warning level of a content of the first alarm signal.

6. A temperature threshold determining method for determining at least one temperature threshold for the temperature of a target apparatus adapted to operate by receiving the electric power, wherein the at least one temperature threshold is used to determine whether or not the target apparatus has a temperature abnormality, the method comprising:
detecting, by a temperature sensor, a temperature of the target apparatus;
storing temperature data indicating the temperature of the target apparatus during past operation in a temperature data storage unit;
determining a representative temperature value of the target apparatus during the past operation, which is derived using the temperature data stored in the temperature data storage unit;
determining the at least one temperature threshold for the temperature of the target apparatus by using the representative temperature value of the target apparatus during the past operation and a reference temperature value of the target apparatus that is preset at a predetermined temperature level at which the apparatus starts to be damaged; and
comparing the temperature data during the current operation of the target apparatus detected by the temperature sensor with the at least one temperature threshold, and generating at least one alarm signal according to a result of the comparison, wherein
when the reference temperature value is Tref, the representative temperature value is Trep, and the at least one temperature threshold is Tth, the at least one temperature threshold Tth is calculated by the formula $Tth=(Tref-Trep)\times k+(Trep),$ where k is a coefficient consisting of real numbers in a range of $0 \leq k \leq 1$.

7. A tangible computer readable storage medium that storages a program for causing a computer to execute the temperature threshold determining method according to claim 6.

8. A temperature threshold determining device that determines a temperature threshold used to determine whether or not a temperature abnormality has occurred in a target apparatus, the temperature threshold determining device comprising:
a temperature data storage unit storing temperature data that indicates temperature of the target apparatus during past operation;
a representative temperature value determining unit that determines a representative temperature value of the target apparatus during the past operation, which is derived using the temperature data stored in the temperature data storage unit;
a temperature threshold determining unit that determines at least one temperature threshold by using the representative temperature value during the past operation and a reference temperature value that is preset at a predetermined temperature level at which the apparatus starts to be damaged,
a temperature sensor that detects temperature of the target apparatus; and a comparison unit that compares the temperature data during the current operation of the target apparatus detected by the temperature sensor with the at least one temperature threshold, and generates at least one alarm signal according to a result of the comparison,
wherein
the target apparatus is arranged in a casing of a board, and
when the reference temperature value is denoted as Tref, the representative temperature value is denoted as Trep, the at least one temperature threshold is denoted as Tth, a temperature indicated by ambient air around the target apparatus in the casing and assumed to be the maximum is denoted as Trefe, and the maximum temperature of the ambient air during the past operation is denoted as Tpmaxr,
the at least one temperature threshold Tth is calculated by the following formula $$Tth = (Tref - (Trep - (Trefe - Tpmaxr))) \times h + Trep - (Trefe - Tpmaxr))$$

where, h is a coefficient consisting of real numbers in a range of $0 \leq h \leq 1$.

9. The temperature threshold determining device according to new claim 8, wherein
the representative temperature value determining unit is configured to read a plurality of temperature values from a plurality of pieces of temperature data stored in the temperature data storage unit, and
determine the highest temperature value among the plurality of temperature values as the representative temperature value.

10. The temperature threshold determining device according to new claim 8 further comprising:
a display unit that displays the at least one temperature threshold determined by the temperature threshold determining unit; and
an instruction receiving unit that receives, as an instruction from the user, whether or not the at least one temperature threshold displayed on the display unit is used in determining whether or not the temperature abnormality has occurred in the target apparatus.

* * * * *